United States Patent
Getlichermann et al.

(10) Patent No.: US 7,550,205 B2
(45) Date of Patent: Jun. 23, 2009

(54) WATERPROOFING MEMBRANE

(75) Inventors: Michel Getlichermann, Mont St. Guibert (BE); Patrick Cogneau, Walhain (BE)

(73) Assignee: Imperbel N.V., Beersel (BE)

( * ) Notice: Subject to any disclaimer, the term of this patent is extended or adjusted under 35 U.S.C. 154(b) by 153 days.

(21) Appl. No.: 11/197,896

(22) Filed: Aug. 5, 2005

(65) Prior Publication Data

US 2006/0110996 A1 May 25, 2006

(51) Int. Cl.
*B32B 11/00* (2006.01)
(52) U.S. Cl. ....................... 428/489; 424/410
(58) Field of Classification Search ................. 428/215, 428/489; 424/410
See application file for complete search history.

(56) References Cited

U.S. PATENT DOCUMENTS

| | | |
|---|---|---|
| 4,291,086 A | 9/1981 | Auten |
| 4,911,975 A | 3/1990 | Schult |
| 5,824,401 A * | 10/1998 | Jenkins et al. .............. 428/215 |
| 7,037,593 B2 * | 5/2006 | Getlichermann et al. .... 428/489 |
| 2005/0158354 A1* | 7/2005 | Hannay et al. .............. 424/410 |

FOREIGN PATENT DOCUMENTS

| | | |
|---|---|---|
| CA | 2143179 | 8/1996 |
| EP | 0876532 | 11/1998 |
| WO | WO 97/24485 | 7/1997 |
| WO | WO 01/40569 | 6/2001 |
| WO | WO 02/46550 | 6/2002 |

* cited by examiner

*Primary Examiner*—Arti Singh-Pandey
(74) *Attorney, Agent, or Firm*—Spencer, Fane, Britt & Browne LLP

(57) ABSTRACT

A waterproofing membrane comprising a structure incorporating a fiber layer and wherein to one side of said structure a bituminous mass is applied and another side of said structure is covered on its surface with a substance comprising a mineral or organic filler and an acrylic polymer, whereby said substance comprises between 15% and 25% by dry weight of said acrylic polymer and mixed therewith between 4% and 22% by dry weight of titanium dioxide.

21 Claims, 4 Drawing Sheets

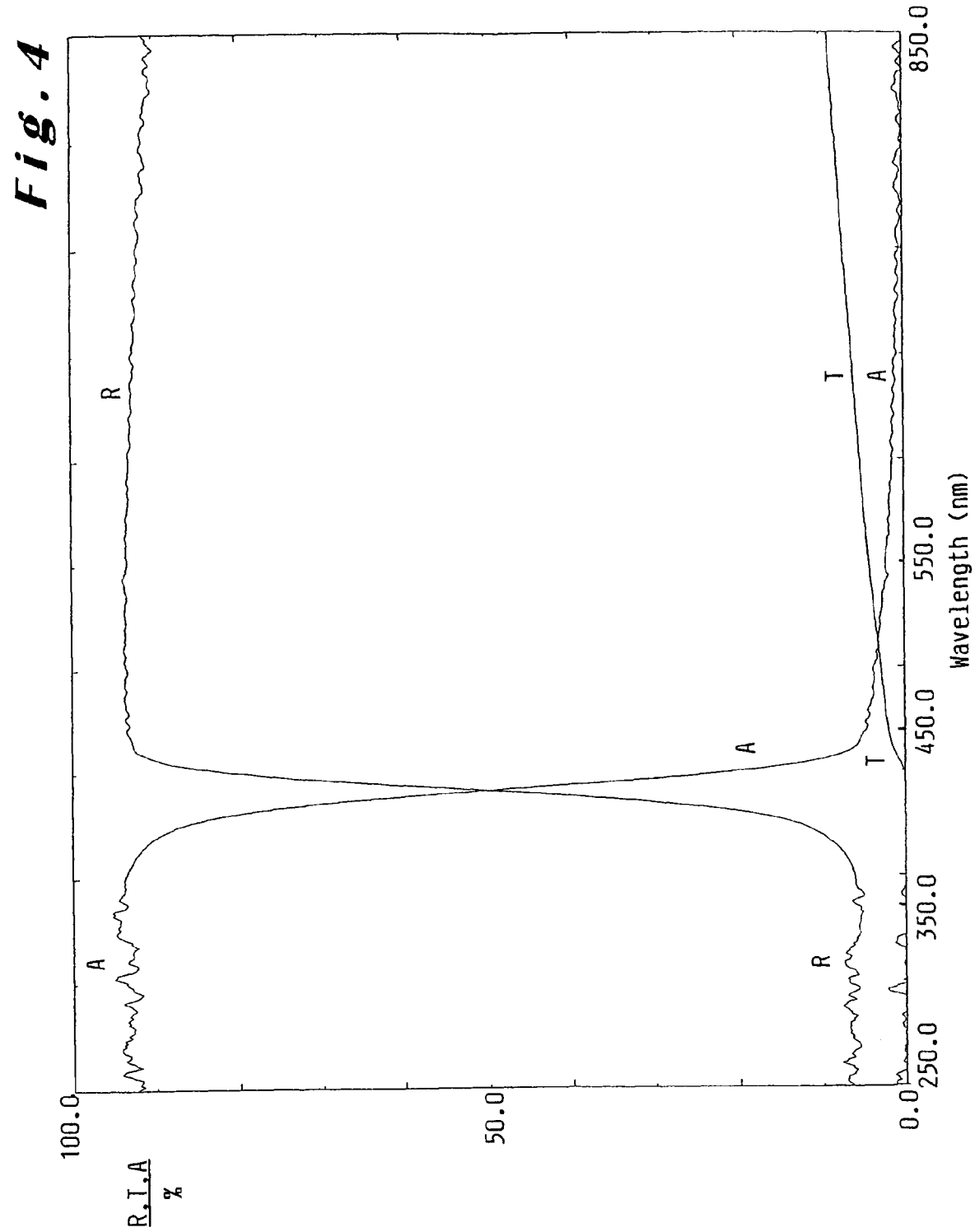

WATERPROOFING MEMBRANE

RELATED APPLICATION

This application claims priority from and incorporates by reference PCT/BE2003/000021, filed Feb. 6, 2003.

FIELD OF THE INVENTION

The invention relates to a waterproofing membrane comprising a structure incorporating a fibre layer and wherein to one side of said structure a bituminous mass is applied and another side of said structure is covered on its surface with a substance comprising a mineral or organic filler and an acrylic polymer.

BACKGROUND OF THE INVENTION

Such a waterproofing membrane is known from EPS 0876532. For manufacturing the known membrane, the bituminous mass is applied to the one side of the structure to which other side a cover layer, formed by a substance, comprising a mineral or organic filler and an acrylic polymer is applied. The substance is applied as a coating to the structure before the bituminous mass is applied. The cover layer protects the membrane against exudation problems caused by ultraviolet rays. The cover layer forms as if to say a barrier against the ultraviolet rays so that the latter can not easily reach the bituminous mass. Therefore the bituminous mass keeps its waterproofing and protective properties for a longer time and substantially less oil of the bituminous mass will migrate to the upper side. In such a manner, less pollution is provoked as the oil will remain in the bituminous mass and not mix with rain water.

Although the described known membrane has improved properties for what concerns its lifecycle and the environment, the standards are changing and new constraints are or will be imposed. One of these constraints is that the membrane, when applied to a roof, must have reflective properties in order to reflect incident sunlight and cause in such a manner less heat to be absorbed by the bituminous mass and the volume covered by the waterproofing membrane. Actually reflective properties are obtained by applying a reflective coating on top of the known membrane. The drawback of applying such a coating is that it requires additional work and thus costs and that the lifetime of the thus obtained reflective layer is rather short. It is therefor needed to regularly paint the membrane surface again in order to maintain the reflective properties.

BRIEF SUMMARY OF THE INVENTION

It is an object of the present invention to realise a waterproofing membrane which is ready for application and complies with the imposed reflection constraints and has a longer lifecycle in comparison with those membranes where a reflective coating is applied to the surface.

A waterproofing membrane according to the present invention is therefor characterised in that said substance comprises between 15% and 25% by dry weight of said acrylic polymer and mixed therewith between 4% and 22% by dry weight of titanium dioxide. The mixture of the acrylic polymer and the titanium dioxide causes the titanium dioxide, which is an appropriate reflective substance, to be integrated in the polymer matrix which is applied to the surface of the structure and penetrates partially therein before the bituminous mass is applied. In such a manner, the titanium dioxide and the UV resistant acrylic polymer are anchored in the structure and can not be easily removed for example by the rain. The mixture of the acrylic polymer and the titanium dioxide in the indicated proportion causes a surprising synergism, which leads to a highly reflective membrane although the rather small amount of used titanium dioxide. The aqueous mixture of the acrylic polymer and the titanium dioxide, which is applied during coating of the structure, enables to form a coating which is uniformly applicable by impregnation or induction to the structure, thus causing a structural bound between mixture and structure.

A first preferred embodiment of a waterproofing membrane according to the invention is characterised in that said substance further comprises between 60 and 75%, preferably 70%, by dry weight of Ca $CO_3$. Calcium carbonate is a suitable filler which does not adversely affect the reflective properties of titanium dioxide.

A second preferred embodiment of a waterproofing membrane according to the invention is characterised in that said bituminous mass comprises a quantity of olefinic polymers with an intrinsic crystallinity lying between 1% and 5% of the concentration of polymers present in the bituminous mass. The presence of this olefinic polymer stabilises the oils in the bituminous mass better because of its intrinsic crystallinity related to its macromolecular structure and to its chemical composition. In this way, the oils are kept in the crystalline zone, thus substantially limiting their ability to migrate under the effect of an increase in temperature. Because the ability to migrate is substantially limited, the risk that brown spots could be formed on the structure is also limited and the membrane will longer maintain its reflective properties.

A third preferred embodiment of a waterproofing membrane is characterised in that said bituminous mass is formed by either an Atactic Polypropylene (APP), an Atactic Poly Alpha Olefin (APAO) or a Thermoplastic Polyolefin (TPO). The presence of titanium dioxide in the substance leads to a white coating thus leading to a less high temperature reached by the bituminous mass when exposed to sunlight. This enables on its turn to use the referred bituminous mass without risk of oil migration.

BRIEF DESCRIPTION OF THE DRAWINGS

The invention will now be described in more details with respect to a preferred embodiment. The FIGS. 1 to 4 show the reflection, absorption and transmission as function of the wavelength.

DETAILED DESCRIPTION

Figure 1:
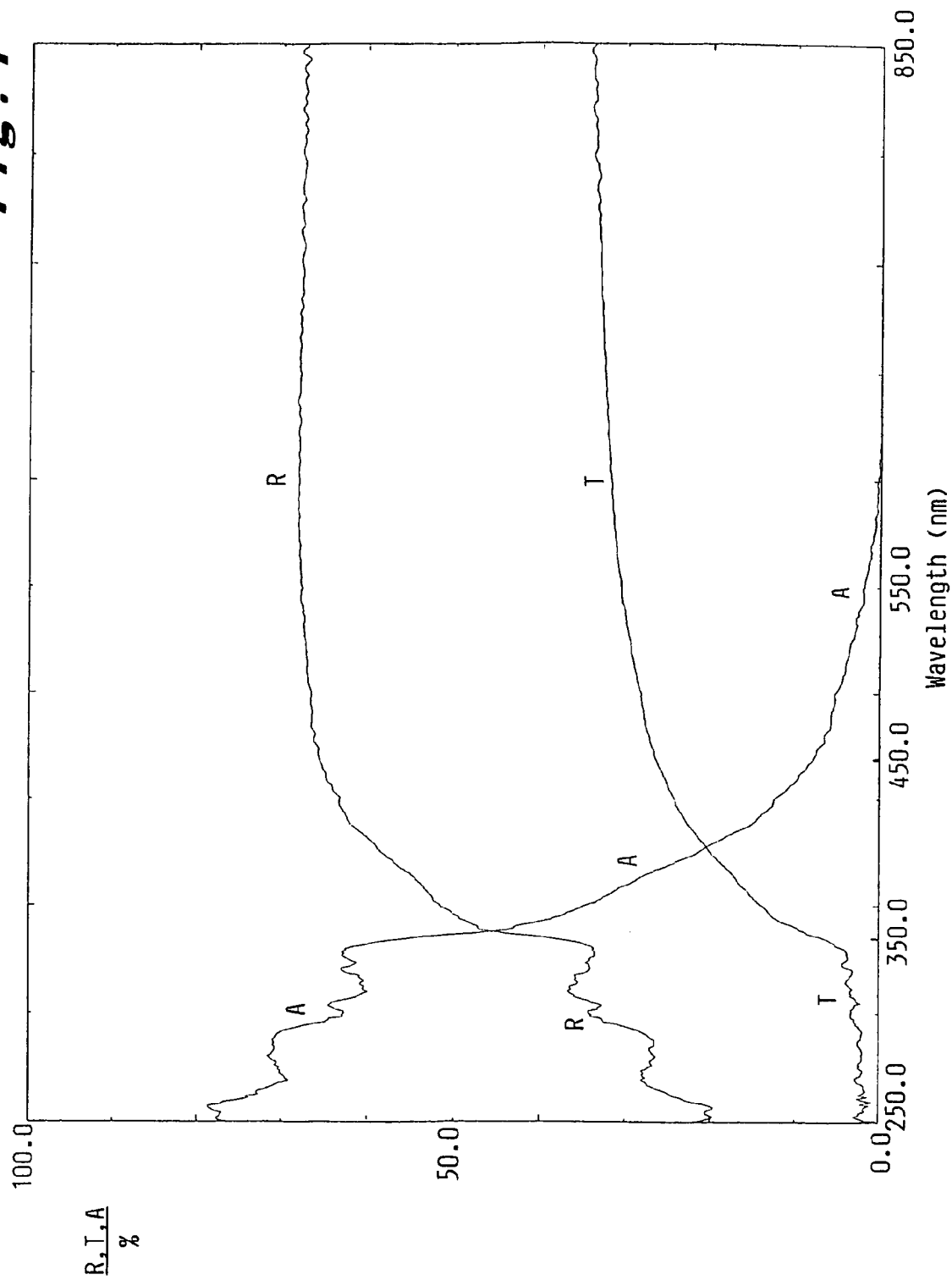

The waterproofing membrane according to the invention comprises a structure incorporating a fibre layer, such as for example a glass fibre. The structure could be a non-woven as well as a woven structure. The structure could also be a composite structure formed by glass fibres and a glass grid, a polyester grid or non-woven polyester. Before applying a bituminous mass to the structure, in order to form the waterproofing membrane, one side of the structure is covered on its surface with a substance comprising a mineral or organic filler and an acrylic polymer. Details of this substance and of the method for applying a bituminous mass to the other side of the structure are given in the European patent EPS 0 876 532, which is hereby incorporated by reference.

The substance used for manufacturing the waterproofing bituminous membrane according to the invention distinguishes however from the one described in EPS 0 876 532 by a different composition. Table 1 gives an example of the composition of the substance.

TABLE I

| Components | % wet weight range | most preferred % wet weight range | preferred % wet weight | preferred % dry weight |
|---|---|---|---|---|
| acrylic polymer | 24.8-39.8 | 27.8-35.8 | 31.8 | 21.7 |
| water | 4-18 | 6-14 | 10 | 0 |
| ammonia | 0-1 | 0-1 | 0.33 | 0.1 |
| dispersing agent | 0.1-0.5 | 0.1-0.5 | 0.12 | 0.05 |
| anti-foaming | 0.1-0.5 | 0.1-0.5 | 0.22 | 0.1 |
| fongicide/algicide | 0.2-2 | 0.5-1.5 | 1 | 1.4 |
| titanium dioxide $TiO_2$ | 3-18 | 5-15 | 5.3 | 7.3 |
| calcium carbonate $CaCO_3$ | 40-60 | 46-56 | 51 | 69 |
| thickener | 0.1-0.7 | 0.1-0.5 | 0.32 | 0.3 |

In comparison with the substance disclosed in EPS 0876532, titanium dioxide ($TiO_2$) has been introduced into the substance and mixed with the other components before the substance was applied to the surface of the structure. By mixing the titanium dioxide with the other components, a link between the other components and the titanium dioxide will be formed so that the thus obtained mixture will remain stable. In such a manner, the titanium dioxide will not easily release from the structure as it is fixed with the acrylic polymer and thus remains firmly anchored on the surface and into the structure to which it is applied.

The mixture with titanium dioxide thus enables to give light and heat reflective properties to the membrane. Indeed new constraints impose or will impose reflective properties to the membrane in order to limit the heat absorption. By the use of the waterproofing membrane according to the invention, those constraints such as for example ASTM C 1549-02 (Standard test method for determination of solar reflectance near ambient temperature using a portable solar reflectometer), are met.

By application of the substance comprising a mixture of an acrylic polymer and titanium dioxide, a homogeneous substance is applied on the structure which consequently adheres thereon. Contrary to the known painting of the membrane, where no penetration into the structure is obtained, thus leading to an easy release, the present invention enables a mechanical anchorage to the structure. There is no superposition of a coating on the structure but an integration. Moreover, by application of the mixture acrylic polymer and titanium dioxide, the overall weight of the structure does not substantially increase. In order to obtain improved reflective properties with the known coating it would be necessary to apply a rather thick coating layer, which would cause problems in winding up the coated structure as the thick coating layer could crack.

Furthermore, experiments have established that the presence of the titanium dioxide does not affect the anti-exudation properties of the membrane. Although titanium dioxide has a larger oil absorption capacity than $CaCO_3$ (25 g/100 g for $TiO_2$ and 17 g/100 g for $CaCO_3$, according to ISO 785/5 norm), this did not affect the integrity of the coating neither the anti-exudation properties. The skilled person would normally expect that the higher oil absorption capacity of $TiO_2$ would not render the latter appropriate to be mixed in the coating substance, in particular if the substance is to be used in combination with a bituminous mass and if its purpose is to reduce exudation. Experiments have however surprisingly proved that the anti-exudation properties were not affected by the presence of $TiO_2$.

The homogeneous mixture of the $TiO_2$ with the rest of the substance provides a homogeneous substance that anchors well on the structure and provides an appropriate protection against UV light. The clear and white colour of the substance obtained by the presence of $TiO_2$ provides excellent anti-reflective properties to the coating. Those properties lead to a smaller increase of the temperature of the bituminous mass and thus to less oil migration.

FIG. 1 illustrates the results of measurements carried out on a coated structure according to the prior art, i.e. without titanium dioxide. Light with an increasing wavelength ($\lambda$ in nanometer) was incident on the membrane and the reflection (R), absorption (A) and transmission (T) were measured as function of the wavelength. The used measurement method is performed by a spectrophotometry method. The weight of dry coating applied on the structure was 260 g/m². As can be seen in FIG. 1, for the visible light range only about 65% of incident light is reflected whereas about 30 to 35% is transmitted.

Figure 2:
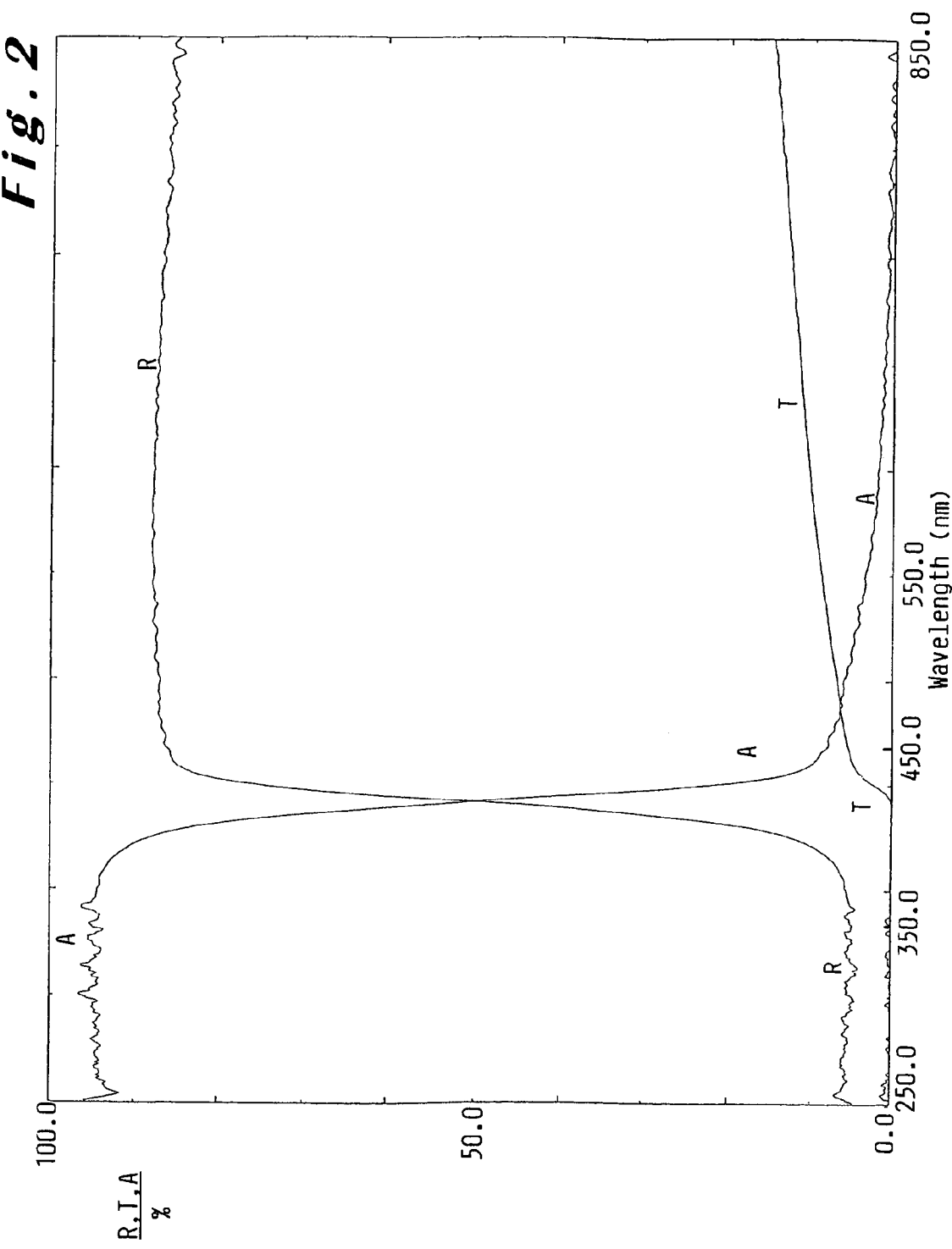

FIG. 2 illustrates the results of a measurement carried out on a coated structure with 7,33% titanium dioxide and 68,8% $CaCO_3$. The reflection is now about 85% in the visible light, and in the infrared about 95% of the energy is reflected.

Figure 3:
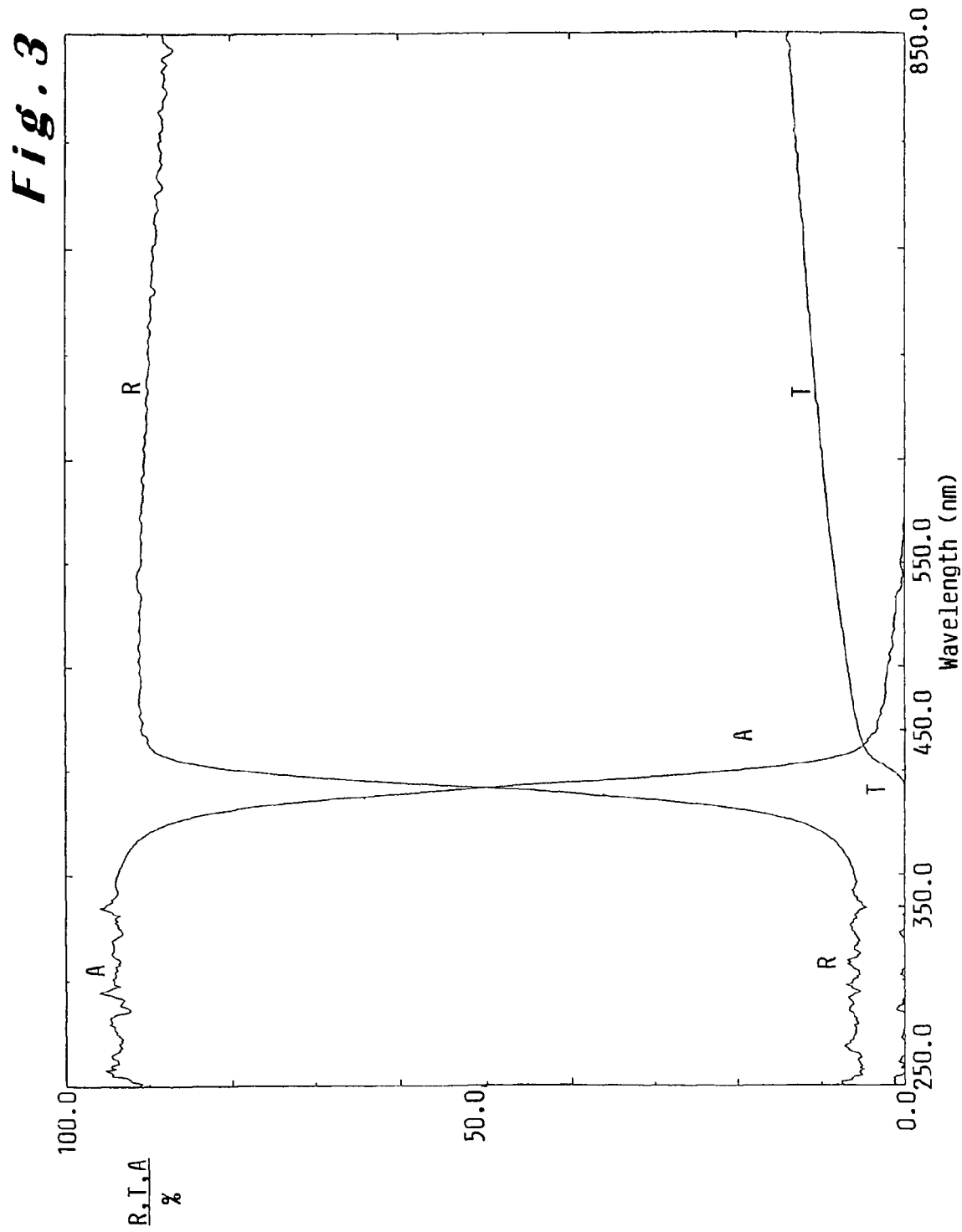

FIGS. 3 and 4 show comparable measurements with 21 respectively 22% of $TiO_2$ and 61,5% respectively 54,15% of $CaCO_3$. As can be deduced from those figures, an increase of the quantity of $TiO_2$ reduces the transmission but without substantially increasing the reflection. An optimum of the amount of $TiO_2$ is thus situated at between 7 and 8%. For the different samples the whiteness of the membrane has also been measured. The results are given in table II.

TABLE II

| | MEASUREMENT | | | |
|---|---|---|---|---|
| | 1 | 2 | 3 | 4 |
| whiteness value | 83.97 | 93.19 | 94.31 | 95.28 |

The properties of the waterproofing membrane according to the invention can further be improved by an appropriate choice of the bituminous mass. Preferably a bituminous mass comprising a quantity of olefinic polymers with an intrinsic crystallinity lying between 1% and 5% of the concentration of the polymers present in the bituminous mass is used. Such a bituminous mass and its properties are described in PCT/BE00/00142 (WO 01/40569) which is hereby incorporated by reference. As described in this application, the presence of an olefinic polymer stabilises the oils in the bituminous mass better because of its intrinsic crystallinity related to its macromolecular structure and to its chemical composition. In such a manner, the oils are kept in the crystalline zones, thus substantially limiting their ability to migrate under the effect of an increase in temperature. This limitation will then on its turn result in a limitation of the phenomenon of spot forming on the structure. Indeed, when oil migrates to the surface, brown spots are formed on the surface of the structure, thereby reducing the reflective properties of the membrane. By limiting the oil migration, the formation of brown spots is consequently limited, which on its turn leads to an increase of the lifetime of the reflective properties.

Furthermore a thermoplastic elastomer based bitumen such as an SBS or SIS could be used as bituminous mass. The thermo-adhesive properties of this bituminous mass enable the application by using a flame or other heat source and avoids black spots due to the heated mass at the overlaps between two successive membranes. Therefore it is not only easier to apply such membranes, but the aesthetic properties remain longer as the risk of black spots is reduced. Preferably at least 8% of thermoplastic elastomer and 0 to 30% by weight of mineral charge should be used for such a bituminous mass.

Due to the improved reflective properties of the coating, it is also possible to use an APP, APAO or TPO bituminous mass. As the oil migration is reduced, this bituminous mass can also be used.

The reflection properties could further be increased by adding barium sulfate, kaolin, silica type matting agents and chalk to the substance.

The invention claimed is:

1. A reflective waterproofing membrane for application over a surface area of a structure, the waterproofing membrane comprising a structure incorporating a fibre layer and wherein to one side of said structure a bituminous mass is applied and another side of said structure is covered on its surface with a reflective substance comprising a mineral or organic filler and an acrylic polymer, and wherein said reflective substance comprises between approximately 15% and 25% by dry weight of said acrylic polymer and mixed therewith between approximately 4% and 22% by dry weight of titanium dioxide.

2. The waterproofing membrane of claim 1 wherein said substance comprises approximately 21% to 23% by dry weight of said acrylic polymer and approximately 7% to 8% by dry weight of said titanium dioxide.

3. The waterproofing membrane of claim 1 wherein said substance further comprises between approximately 60% and 75%, preferably approximately 70%, by dry weight of CaCO$_3$.

4. The waterproofing membrane as claimed in claim 1 wherein said bituminous mass comprises a quantity of olefinic polymers with an intrinsic crystallinity lying between approximately 1% and 5% of the concentration of polymers present in the bituminous mass.

5. The waterproofing membrane of claim 1 wherein said bituminous mass is formed by either an Atactic Polypropylene (APP), an Atactic Poly Alpha Olefin (APAO) or a Thermoplastic Polyolefin (TPO).

6. The waterproofing membrane of claim 1 wherein said bituminous mass is formed by a Styrene Butadiene Styrene (SBS).

7. The waterproofing membrane of claim 6 wherein said SBS comprises at least approximately 8% of thermoplastic elastomer.

8. The waterproofing membrane of claim 1 wherein said substance also comprises a dispersion, an anti-foaming and a thickener.

9. A waterproofing membrane comprising a fibre layer having a first side and a second side and wherein a bituminous mass is applied to the first side, and the second side is substantially covered on its surface with a substance comprising a mineral or organic filler, a polymer, and a material having a high reflective index.

10. The waterproofing membrane of claim 9 wherein said polymer comprises an acrylic polymer.

11. The waterproofing membrane of claim 9 wherein said material having a high reflective index comprises titanium dioxide.

12. The waterproofing membrane of claim 9 wherein said substance comprises between approximately 15% to 25% by dry weight of said polymer and mixed therewith between approximately 4% and 22% of said material having a high reflective index.

13. The waterproofing membrane of claim 9 wherein said substance comprises between approximately 21% to 23% by dry weight of said polymer and mixed therewith between approximately 4% and 22% by dry weight of said material having a high reflective index.

14. The waterproofing membrane of claim 13 wherein said substance further comprises between approximately 60% and 75%, by dry weight of CaCO$_3$ and said material is titanium dioxide.

15. The waterproofing membrane of claim 9 wherein said bituminous mass comprises a quantity of olefinic polymers with an intrinsic crystallinity lying between approximately 1% and 5% of the concentration of polymers present in the bituminous mass.

16. The waterproofing membrane of claim 9 wherein said bituminous mass is formed by either an Atactic Polypropylene (APP), an Atactic Poly Alpha Olefin (APOA) or a Thermoplastic Polyolefin (TPO).

17. The waterproofing membrane of claim 9 wherein said bituminous mass is formed by a Styrene Butadiene Styrene (SBS).

18. The waterproofing membrane of claim 17 wherein said SBS comprises at least approximately 8% of thermoplastic elastomer.

19. The waterproofing membrane of claim 9 wherein said substance also comprises a dispersion, an anti-foaming and a thickener.

20. A waterproofing membrane comprising a fibre layer having a first side and a second side and wherein a bituminous mass is applied to the first side, and the second side is substantially covered on its surface with a substance comprising a mineral or organic filler, a polymer, and a material having a high reflective index providing a reflection of at least approximately 85% of visible light.

21. The waterproofing membrane of claim 20 wherein said material having a high reflective index reflects approximately 95% of infrared light.

* * * * *